United States Patent
Fu (10) Patent No.: US 9,432,231 B1
(45) Date of Patent: Aug. 30, 2016

(54) DIGITAL FREQUENCY MODULATION RECEIVER WITH FREQUENCY VARIATION SIGNAL AND DEMODULATION METHOD USED BY THE SAME

(71) Applicant: RichWave Technology Corp., Taipei (TW)

(72) Inventor: Zhuo Fu, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 14/833,151

(22) Filed: Aug. 24, 2015

(30) Foreign Application Priority Data

Mar. 6, 2015 (TW) .............................. 104107208 A (51) Int. Cl.
    *H04L 27/00*     (2006.01)
    *H04L 27/227*     (2006.01)
    *H04L 27/148*     (2006.01)

(52) U.S. Cl.
    CPC ......... *H04L 27/2275* (2013.01); *H04L 27/148* (2013.01)

(58) Field of Classification Search
    CPC .................... H04L 27/2275; H04L 27/148
    USPC .................... 375/325, 324; 327/158
    See application file for complete search history.

(56) References Cited

U.S. PATENT DOCUMENTS

| 2004/0208264 | A1 | 10/2004 | Norris | |
| 2009/0154603 | A1* | 6/2009 | Li | H04B 1/0007 375/324 |
| 2016/0056827 | A1* | 2/2016 | Vlachogiannakis | H03B 5/1265 327/158 |

OTHER PUBLICATIONS

Simon Haykin, "Communication Systems," John Wiley & Sons, Inc., 4th ed., cover page, xiv, and pp. 157-160, 2001.

* cited by examiner

*Primary Examiner* — Hirdepal Singh
*Assistant Examiner* — Fitwi Hailegiorgis
(74) *Attorney, Agent, or Firm* — Winston Hsu; Scott Margo (57) ABSTRACT

A digital frequency modulation receiver includes a phase capturer, an adder, a digital filter and a phase estimator. The phase estimator is used to generate a first phase value according to an input signal. The adder is coupled to the phase estimator for subtracting a second phase value from the first phase value to generate a phase difference. The digital filter is coupled to the adder for performing a filtering calculation with the phase difference so as to generate a frequency variation signal. The phase estimator is coupled to the digital filter and the adder so as to update the second phase value according to the frequency variation signal.

15 Claims, 14 Drawing Sheets

DIGITAL FREQUENCY MODULATION RECEIVER WITH FREQUENCY VARIATION SIGNAL AND DEMODULATION METHOD USED BY THE SAME

CROSS REFERENCE TO RELATED APPLICATION

This application claims priority to Taiwan Patent Application No. 104107208, filed Mar. 6, 2015, and incorporated herein by reference in its entirety.

TECHNICAL FIELD

The technical field relates to a digital frequency modulation receiver, and more particularly, a digital frequency modulation receiver with frequency variation signal.

BACKGROUND

A frequency modulation (hereinafter referred to as "FM") demodulation receiver is easily affected by threshold effect. When the amplitude of noise is larger than the amplitude of a signal, threshold effect happens so that received signal phase is affected, multiple spikes are observed on demodulated signal, and signal to noise ratio (SNR) rapidly deteriorates. If installing a phase lock loop (PLL) in an FM demodulation receiver, the onset of threshold effect may be pushed to lower signal level, which results in better receiver performance; however, some shortages could be unavoidable. The phase lock loop installed in an FM demodulation receiver usually operates with a voltage controlled oscillator. Since a phase lock loop and a voltage controlled oscillator are both high-priced components, the related hardware cost is difficult to be reduced. Power consumption of the circuit configuration of the prior art is high for using these components. Hence, an FM demodulation receiver of lower cost, smaller power consumption and better ability against threshold effect is required in the related field.

SUMMARY

An embodiment of the present invention discloses a digital frequency modulation receiver including a phase capturer, a first adder, a digital filter and a phase estimator. The phase capturer is configured to generate a first phase value according to an input signal. The first adder is coupled to the phase capturer and configured to subtract a second phase value from the first phase value to generate a phase difference. The digital filter is coupled to the first adder and configured to perform a filtering calculation with the phase difference to generate a frequency variation signal. The phase estimator is coupled to the digital filter and the first adder and configured to update the second phase value according to the frequency variation signal.

Another embodiment of the present invention discloses a demodulation method used by a digital frequency modulation receiver. The demodulation method includes generating a first phase value according to an input signal; subtracting a second phase value from the first phase value to generate a phase difference; performing a filtering calculation to generate a frequency variation signal; and updating the second phase value according to the frequency variation signal.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
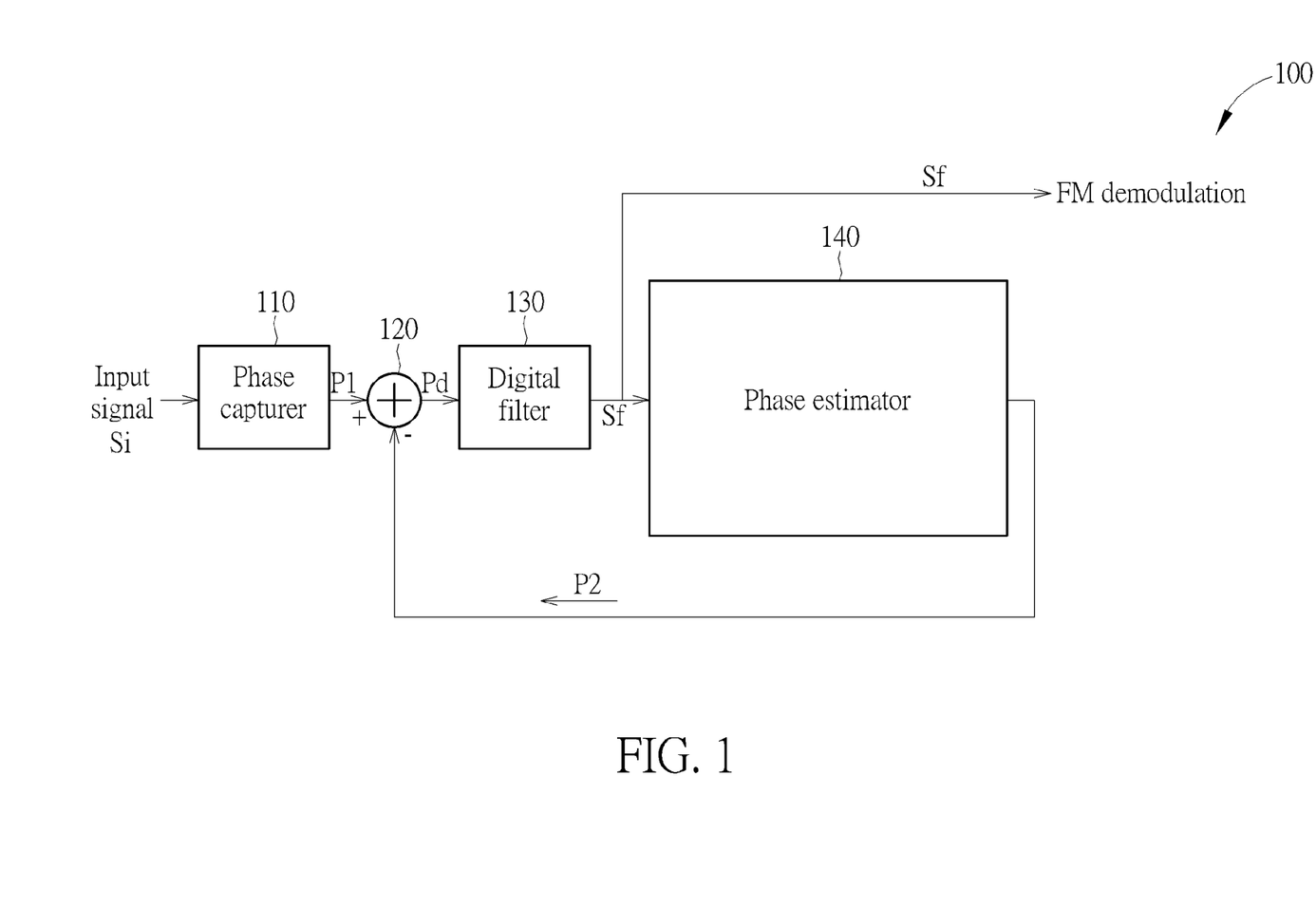
FIG. 1 illustrates a digital FM receiver according to an embodiment of the present invention.

FIG. 1 illustrates a digital FM receiver 100 according to an embodiment of the present invention. The digital FM receiver 100 includes a phase capturer 110, an adder 120, a digital filter 130 and a phase estimator 140. The phase capturer 110 is configured to generate a first phase value P1 according to an input signal Si. The adder 120 is coupled to the phase capturer 110 and configured to subtract a second phase value P2 from the first phase value P1 to generate a phase difference Pd. The digital filter 130 is coupled to the adder 120 and configured to perform a filtering calculation with the phase difference Pd to generate a frequency variation signal Sf. The phase estimator 140 is coupled to the digital filter 130 and the adder 120 and configured to update the second phase value P2 according to the frequency variation signal Sf.

The aforementioned input signal Si may be a frequency selection signal generated corresponding to channel selection performed by a channel selection filter (CSF). The first phase value P1 may be a measured phase, and the second phase value P2 may be an expected phase. The phase capturer 110 may be (but not limited to) a coordinate rotation digital computing (cordic) converter used to capture phases of the input signal Si with a trigonometric calculation. The adder 110 is an adder used to perform subtraction for subtract the second phase value P2 from the first phase value P1 to generate the phase difference Pd. The phase estimator 140 may output the second phase value P2 according to an estimated frequency and generate the updated second phase value P2 corresponding to the newly received input signal Si. Since the first phase value P1 varies corresponding to the variation of the input signal Si, the difference between the first phase value P1 and a required phase value may be continually calculated for performing constant correction by using the adder 110 to subtract the second phase value P2 from the first phase value P1 to generate the phase difference Pd for updating the second phase value P2 correspondingly, and the function of a phase lock loop is therefore achieved. The digital FM receiver 100 disclosed by an embodiment of the present invention may detect the rotation of a vector corresponding to the variation of phase, since a sample rate of measuring the input signal Si is known in advance, the difference of phase between two times of measuring is calculable for generating a signal used for performing FM demodulation. The digital FM receiver disclosed by an embodiment of the present invention is a feedback system. When the input signal Si keeps varying, a lock process performed by the digital FM receiver may generate the phase difference Pd (which is not zero for instance) constantly for updating the second phase value P2 so that a frequency variation of the input signal Si may be detected to be used in FM demodulation. By adopting the design configuration disclosed by the present invention, a physical voltage controlled oscillator is no longer required for generating a clock waveform, and a physical phase lock loop is not required, either. Conceptually, it may be considered that a virtual phase lock loop and a virtual voltage controller oscillator are used. Regarding noise, since the phase of noise often evenly spreads on a frequency spectrum without coherence, the phase error corresponding to noise is usually of high frequency, the digital filter 130 may be a low-pass filter such as a low-pass loop filer to filter the unnecessary high frequency part out and keep required low frequency part to be tracked in order to generate the aforementioned frequency variation signal Sf. The frequency variation signal Sf may carry information of frequency variation. Since a FM signal may carry information by using the variation of frequency, the frequency variation signal Sf may be used for performing FM demodulation to generate a demodulated signal such as a voice signal, and a user may receive information such as voice of a radio program after the FM demodulation.

Figure 2:
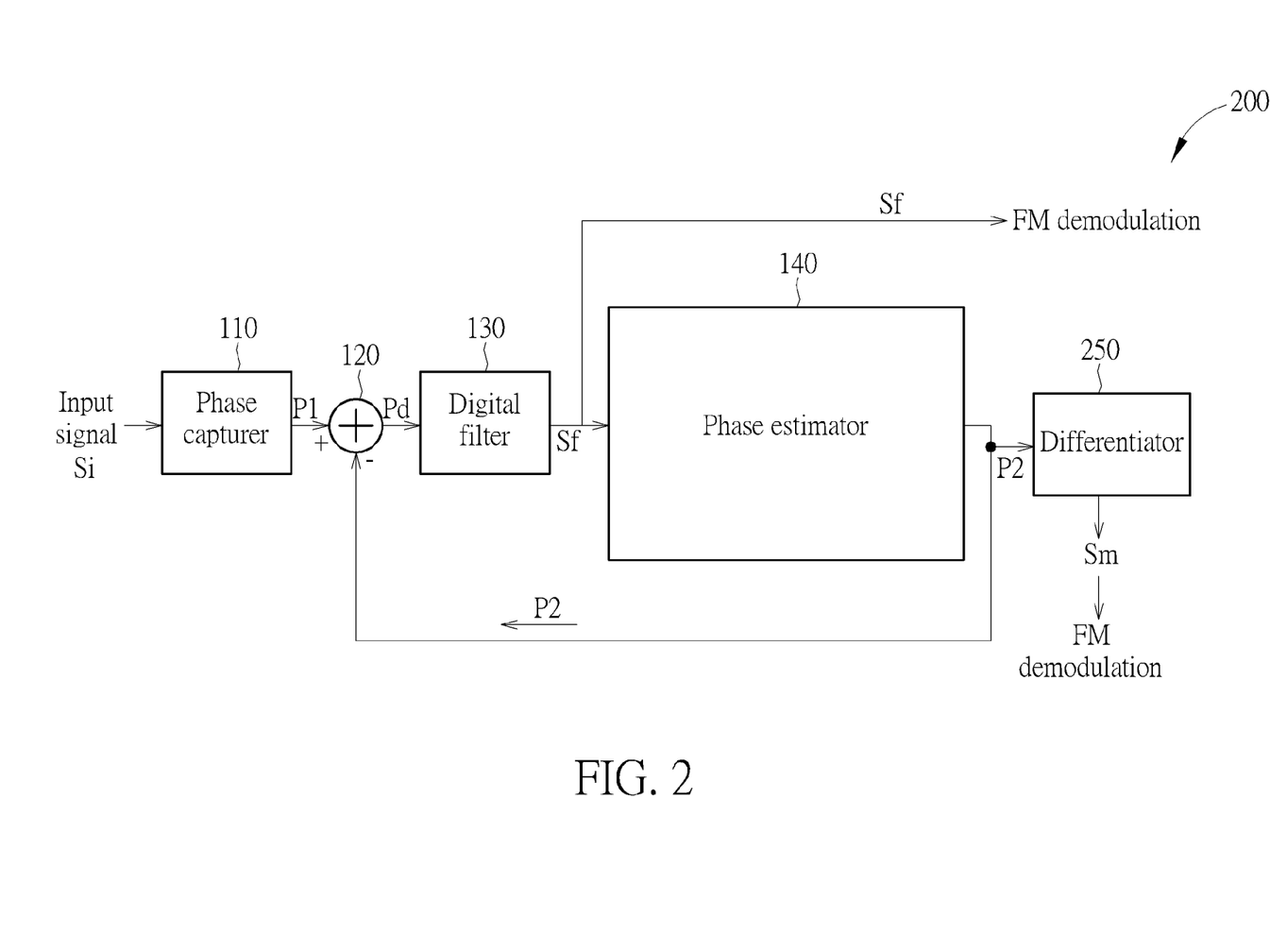
FIG. 2 illustrates a digital FM receiver according to another embodiment of the present invention.

FIG. 2 illustrates a digital FM receiver 200 according to another embodiment of the present invention. Comparing with the digital FM receiver 100 of FIG. 1, the digital FM receiver 200 further includes a differentiator 250. The differentiator 250 is coupled to the phase estimator 140 and configured to differentiate the second phase value P2 to generate a frequency modulation signal Sm used for performing frequency modulation demodulation to generate a demodulated signal such as voice of a radio program.

Figure 3:
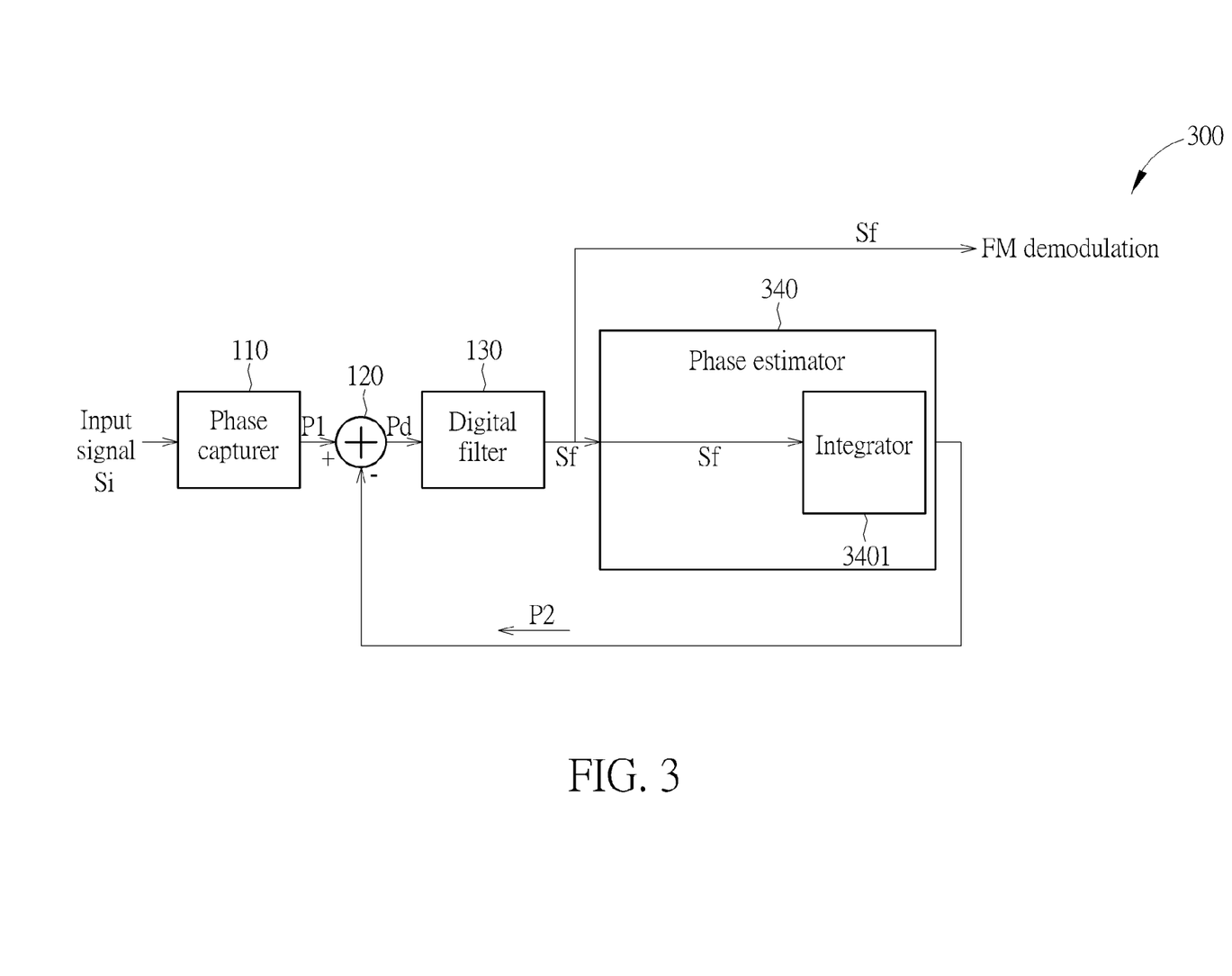
FIG. 3 illustrates a digital FM receiver according to another embodiment of the present invention.

FIG. 3 illustrates a digital FM receiver 300 according to another embodiment of the present invention. Comparing with the digital FM receiver 100 of FIG. 1, the phase estimator 340 further includes an integrator 3401 coupled to the digital filter 130 and configured to integrate the frequency variation signal Sf to update the second phase value P2. According to an embodiment, the integrator 3401 may perform Z-transform calculation as the following equation ($\alpha$).

$$X(Z)=Z^{-1}/(1-Z^{-1}) \quad (\alpha).$$

Figure 4:
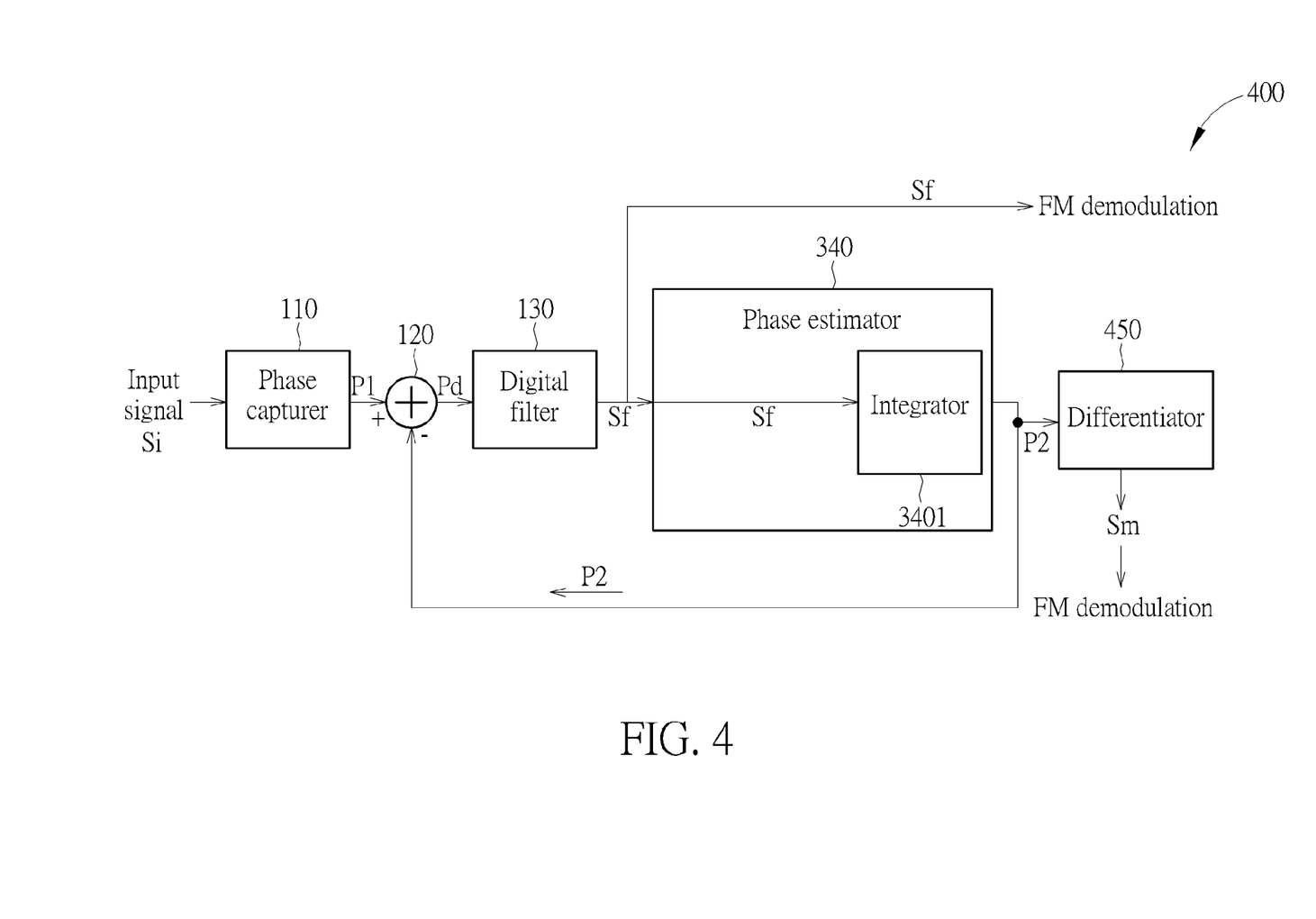
FIG. 4 illustrates a digital FM receiver according to another embodiment of the present invention.

FIG. 4 illustrates a digital FM receiver 400 according to another embodiment of the present invention. Comparing with the digital FM receiver 300 of FIG. 3, the digital FM receiver 400 further includes a differentiator 450 configured to differentiate the second phase value P2 to generate a frequency modulation signal Sm.

Figure 5:
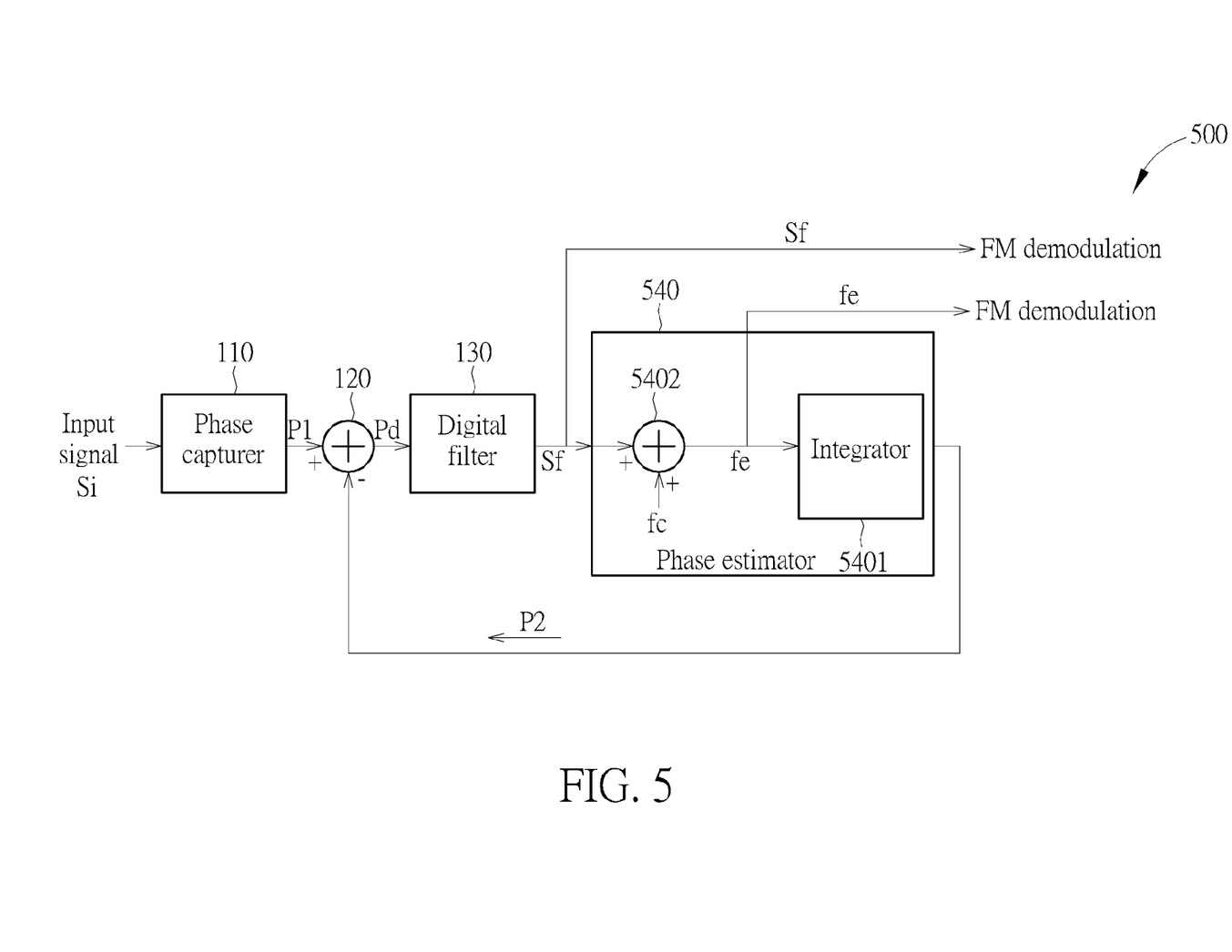
FIG. 5 illustrates a digital FM receiver according to another embodiment of the present invention.

FIG. 5 illustrates a digital FM receiver 500 according to another embodiment of the present invention. Comparing with FIG. 1, the phase estimator 540 further includes an integrator 5401 and an adder 5402. The adder 5402 is coupled to the digital filter 130 and a carrier-wave source and configured to add the frequency variation signal Sf and a carrier-wave frequency fc to generate an estimated frequency fe. The integrator 5401 is coupled to the adder 5402 and configured to integrate the estimated frequency fe to update the second phase value P2, and the calculation performed by the integrator 5401 may be (but not limited) as shown as the abovementioned equation ($\alpha$). Each of the frequency variation signal Sf and the estimated frequency fe includes information corresponding to variation of frequency, so each of the frequency variation signal Sf and the estimated frequency fe may be used for FM demodulation for generating a demodulated signal such as voice of a radio program. One of the frequency variation signal Sf and the estimated frequency fe may be selected for FM demodulation.

Figure 6:
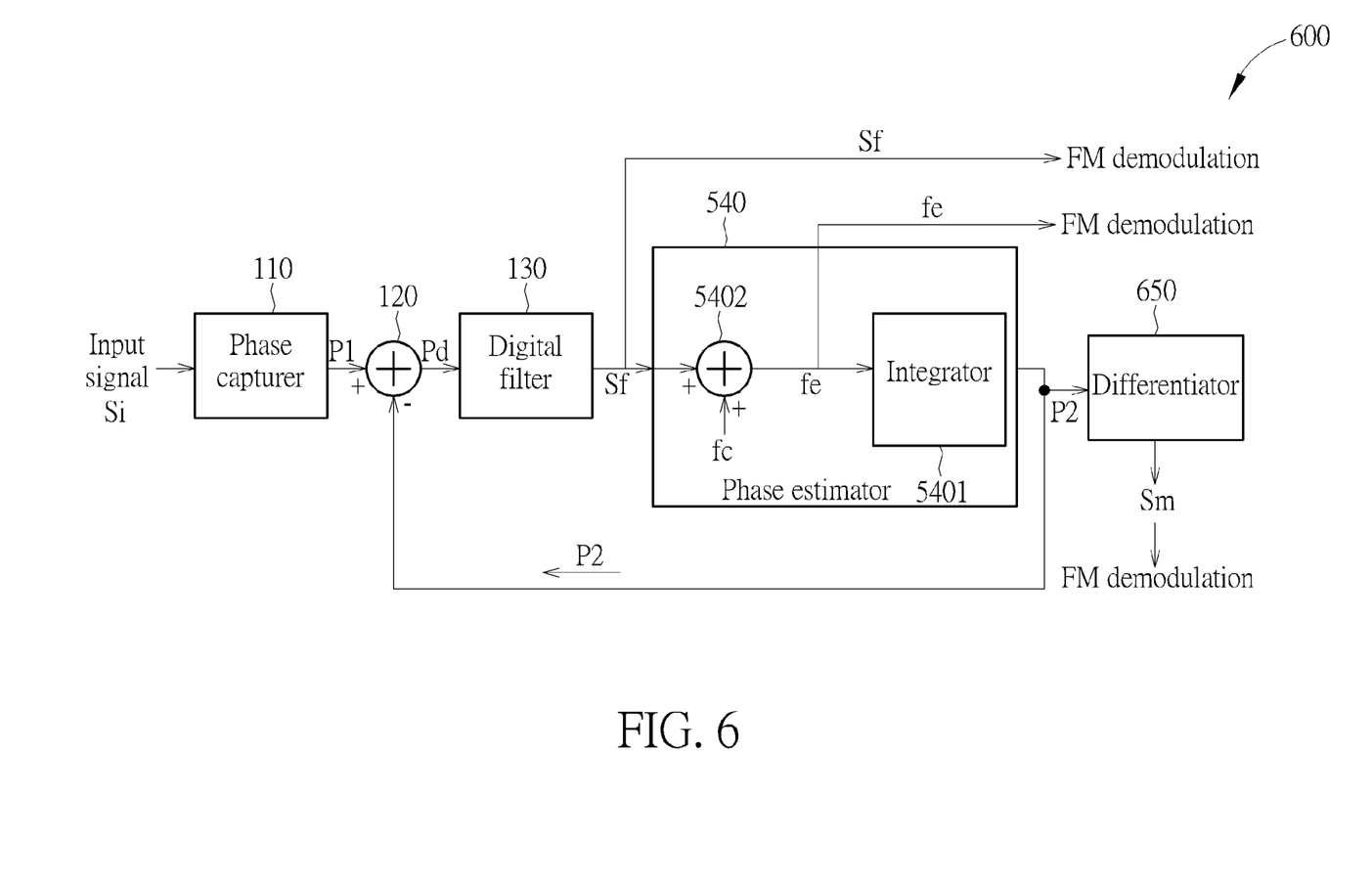
FIG. 6 illustrates a digital FM receiver according to another embodiment of the present invention.

FIG. 6 illustrates a digital FM receiver 600 according to another embodiment of the present invention. Comparing with the FIG. 5, the digital FM receiver 600 further includes a differentiator 650 for differentiating the second phase value P2 to generate a frequency modulation signal Sm.

Figure 7:
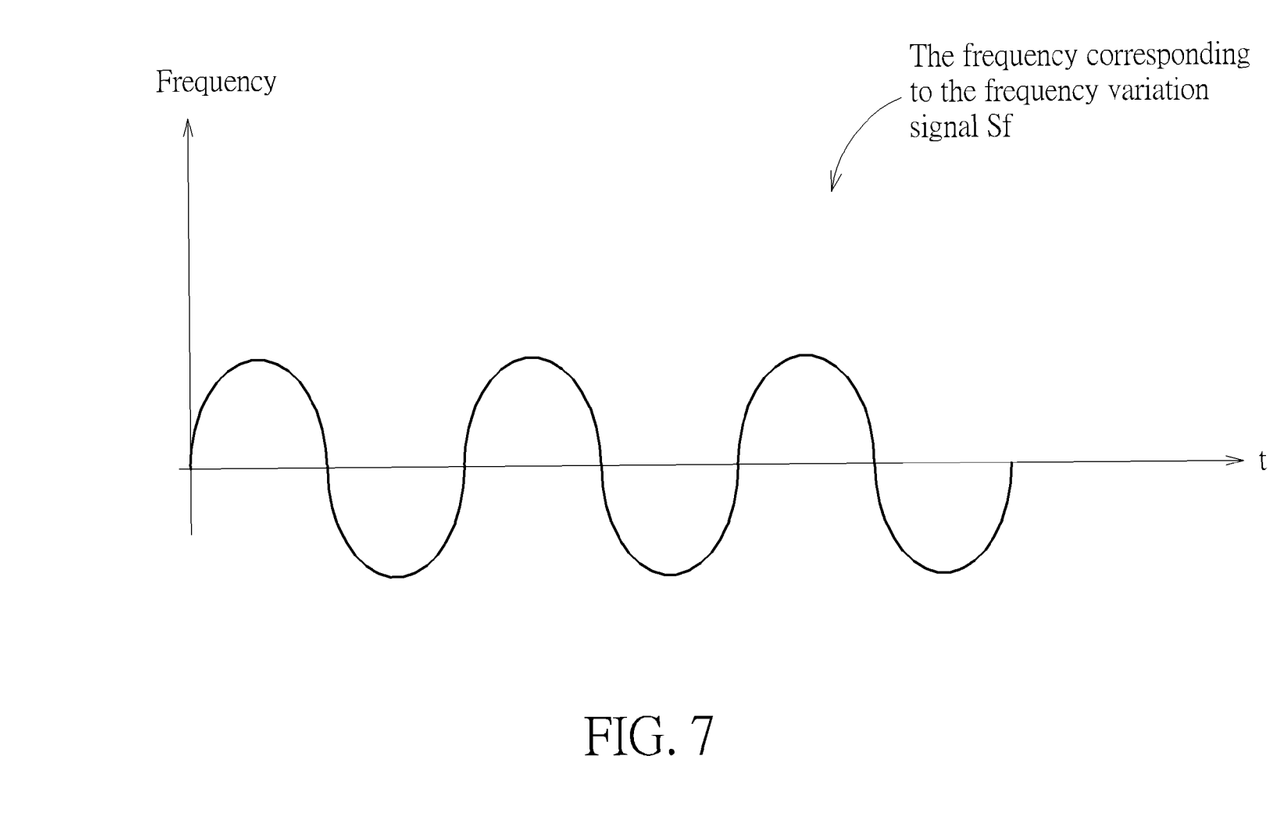
FIG. 7 illustrates a frequency waveform diagram corresponding to the frequency variation signal.
Figure 8:
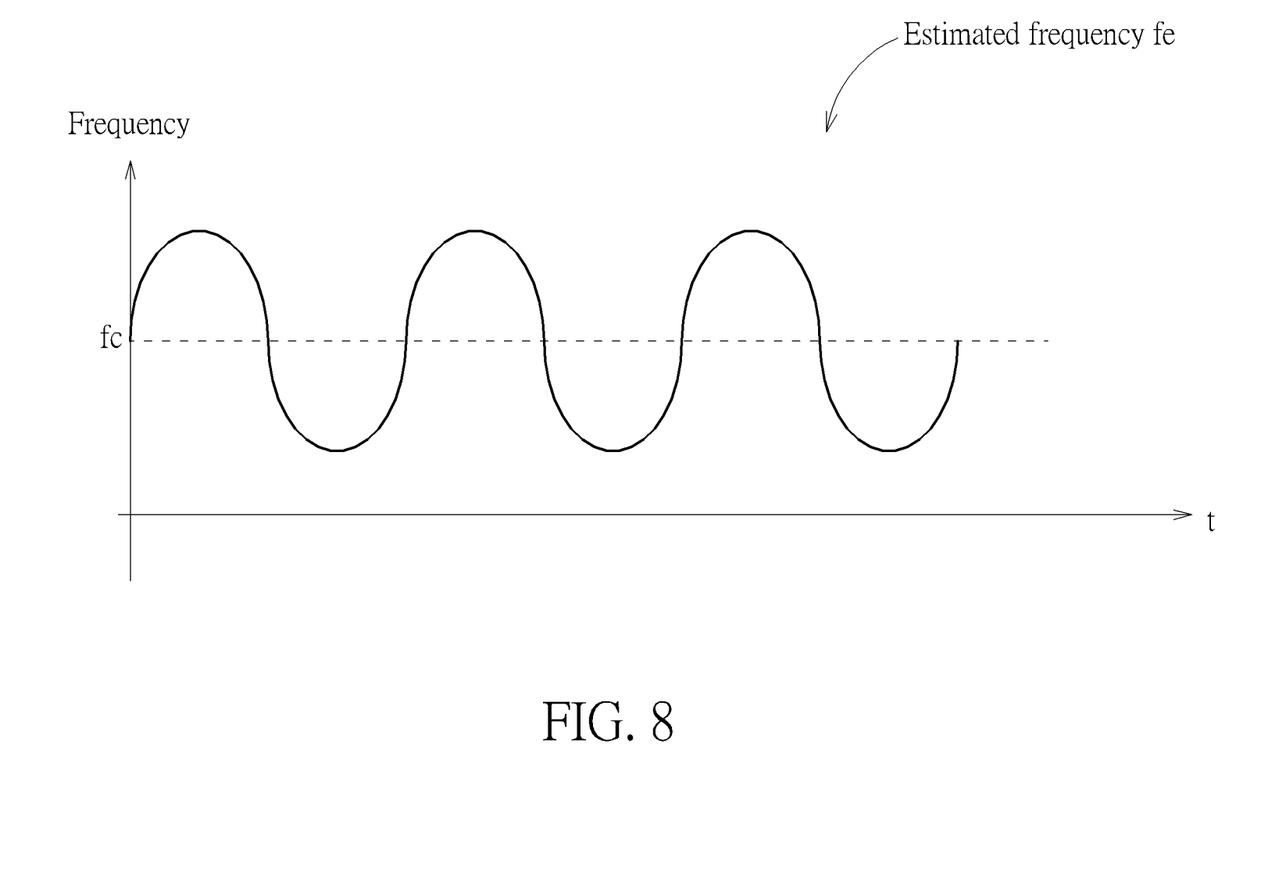
FIG. 8 illustrates a waveform diagram related to the frequency corresponding to the frequency variation signal, the carrier-wave frequency and the estimated frequency.

FIG. 7 illustrates a frequency waveform diagram corresponding to the frequency variation signal Sf. FIG. 8 illustrates a waveform diagram related to the frequency corresponding to the frequency variation signal Sf, the carrier-wave frequency fc and the estimated frequency fe. As shown in FIGS. 7 and 8, by using the adder 5402 to add the frequency corresponding to the frequency variation signal Sf and the carrier-wave frequency fc for generating the estimated frequency fe, the estimated frequency fe is higher than the frequency corresponding to the frequency variation signal Sf by the carrier-wave frequency fc. The carrier-wave frequency fc may be (but not limited to) 150 kilo hertz.

Each of the digital FM receivers 100 to 600 disclosed by abovementioned embodiments of the present invention supports the function of phase lock loop, so physical phase lock loop and voltage controller oscillator could be omitted, and it could be unnecessary to generate a clock waveform. The hardware cost and the power consumption may be hence reduced. The aforementioned second phase value may be (but not limited to) a set of digital code with multiple digits such as a set of 10-bit digital code used for separating phase of 360 degrees into 1024 parts in which each part corresponds to 0.3515625 degrees, that is (360/1024) degrees. A phase angle of high accuracy may be defined accordingly.

Figure 9:
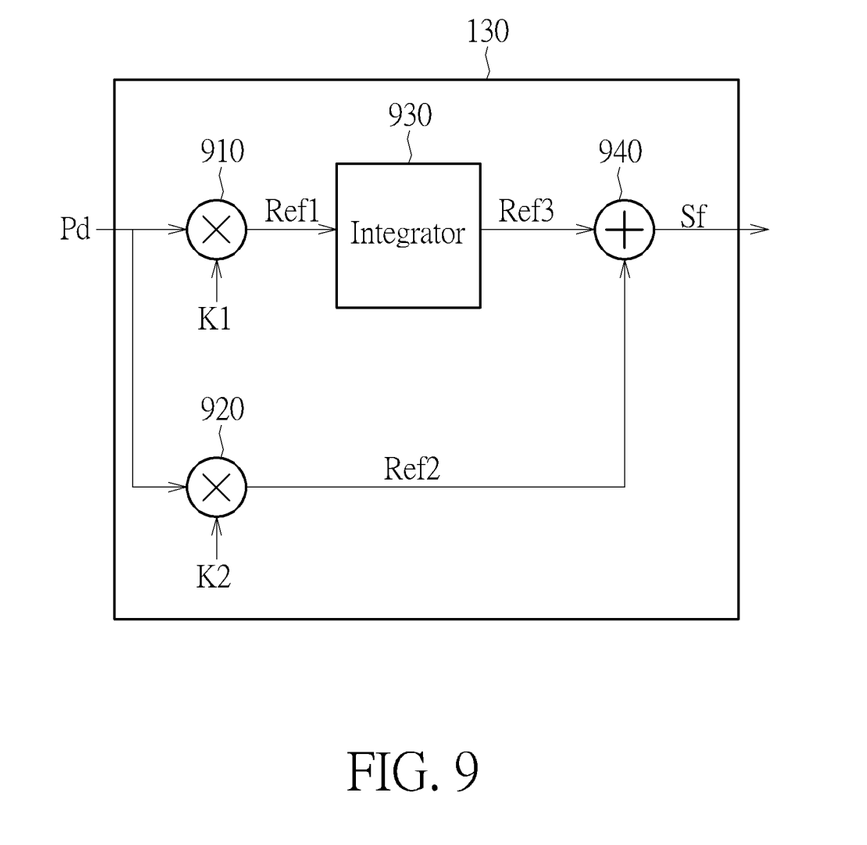
FIG. 9 illustrates the digital filter according to an embodiment of the present invention.

FIG. 9 illustrates the digital filter 130 according to an embodiment of the present invention. The digital filter 130 may be a second order filter including multipliers 910 and 920, an integrator 930 and an adder 940. The multiplier 910 may be coupled to the aforementioned adder 120 and configured to multiply the phase difference Pd by a parameter K1 to generate a reference value Ref1. The multiplier 920 may be coupled to the adder 120 and configured to multiply the phase difference Pd by a parameter K2 to generate a reference value Ref2. The integrator 930 may be coupled to the multiplier 910 and configured to integrate the reference value Ref1 to generate a reference value Ref3. The adder 940 may be coupled to the integrator 930 and the multiplier 920 and configured to add the reference value Ref3 and the reference value Ref2 to generate the frequency variation signal Sf. The integrator 930 may perform Z-transform calculation, and the used equation may be (but not limited to) the abovementioned equation (α).

Each of the aforementioned parameters K1 and K2 may be a number of a power of 2 (such as ½, ¼ . . . , or 1/32) for reducing hardware complexity and cost. The parameters K1 and K2 may be adjusted by a user for selecting most suitable values. Take parameters K1=1/32 and K2=½ for example, the second order filter of FIG. 9 may correspond to the following equation (γ) for performing low-pass filtering calculation.

$$H(Z)$$
$$=[K2+(K1-K2) \cdot Z^{-1}]/(1-Z^{-1})$$
$$=[(½)+(15/32) \cdot Z^{-1}]/(1-Z^{-1}) \qquad (γ).$$

Figure 10:
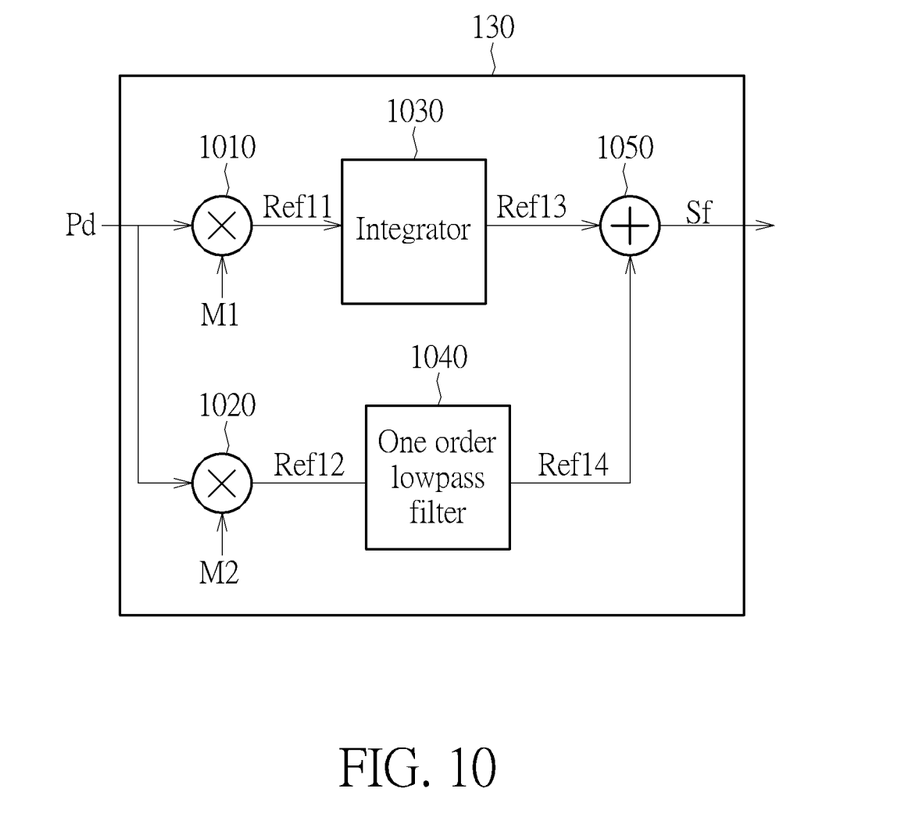
FIG. 10 illustrates the digital filter according to another embodiment of the present invention.

FIG. 10 illustrates the digital filter 130 according to another embodiment of the present invention. The digital filter 130 may be a third order lowpass filter including multipliers 1010 and 1020, an integrator 1030, a one order lowpass filter 1040 and an adder 1050. The multiplier 1010 may be coupled to the adder 120 and configured to multiply the phase difference Pd by a parameter M1 to generate a reference value Ref11. The multiplier 1020 may be coupled to the adder 120 and configured to multiply the phase difference Pd by a parameter M2 to generate a reference value Ref12. The integrator 1030 may be coupled to the multiplier 1010 and configured to integrate the reference value Ref11 to generate a reference value Ref13. The one order lowpass filter 1040 may be coupled to the multiplier 1020 and configured to perform lowpass filtering with the reference value Ref12 to generate a reference value Ref14. The adder 1050 may be coupled to the integrator 1030 and the one order lowpass filter 1040 and configured to add the reference value Ref13 and the reference value Ref14 to generate the frequency variation signal Sf. Each of the parameters M1 and M2 may be a number of a power of 2 (such as ½, ¼ . . . , or 1/32) for reducing hardware complexity and cost. The parameters M1 and M2 may be adjusted by a user for selecting most suitable values. The integrator 1030 may perform Z-transform calculation, and the used equation may be (but not limited to) the following equation (δ).

$$A(Z)=1/(1-Z^{-1}) \qquad (δ).$$

Comparing with the aforementioned equation (α), the equation (δ) may not include the variable $Z^{-1}$. The integrator 1030 may lead to a delay. The one order filter 1040 may correspond (but not limited) to the following equation (ε).

$$B(Z)=1/(1-a \cdot Z^{-1}) \qquad (ε)$$

The absolute value of the parameter a in the equation (ε) is less than 1, i.e. |a|<1. Hence, the third order lowpass filter illustrated in FIG. 10 may correspond (but not limited) to the following equation (ζ) for performing low-pass filtering calculation.

$$H(Z)$$
$$=[M1/(1-Z^{-1})]+[M2/(1-a \cdot Z^{-1})]$$
$$=[M1+M2-(M2+a \cdot M1)Z^{-1}]/[(1-Z^{-1}) \cdot (1-a \cdot Z^{-1})] \qquad (ζ).$$

Each of the second order lowpass filter and the third order lowpass filter of FIGS. 9 and 10 illustrates an internal block diagram of the digital filter of the digital FM receiver according to an embodiment of the present invention. However, the configuration of the digital filter used in the digital FM receiver of the present invention is not limited to what is shown in FIGS. 9 and 10. A designer is allowed to calculate for deciding the specification of the required filter for being implemented with digital circuitry.

Figure 11:
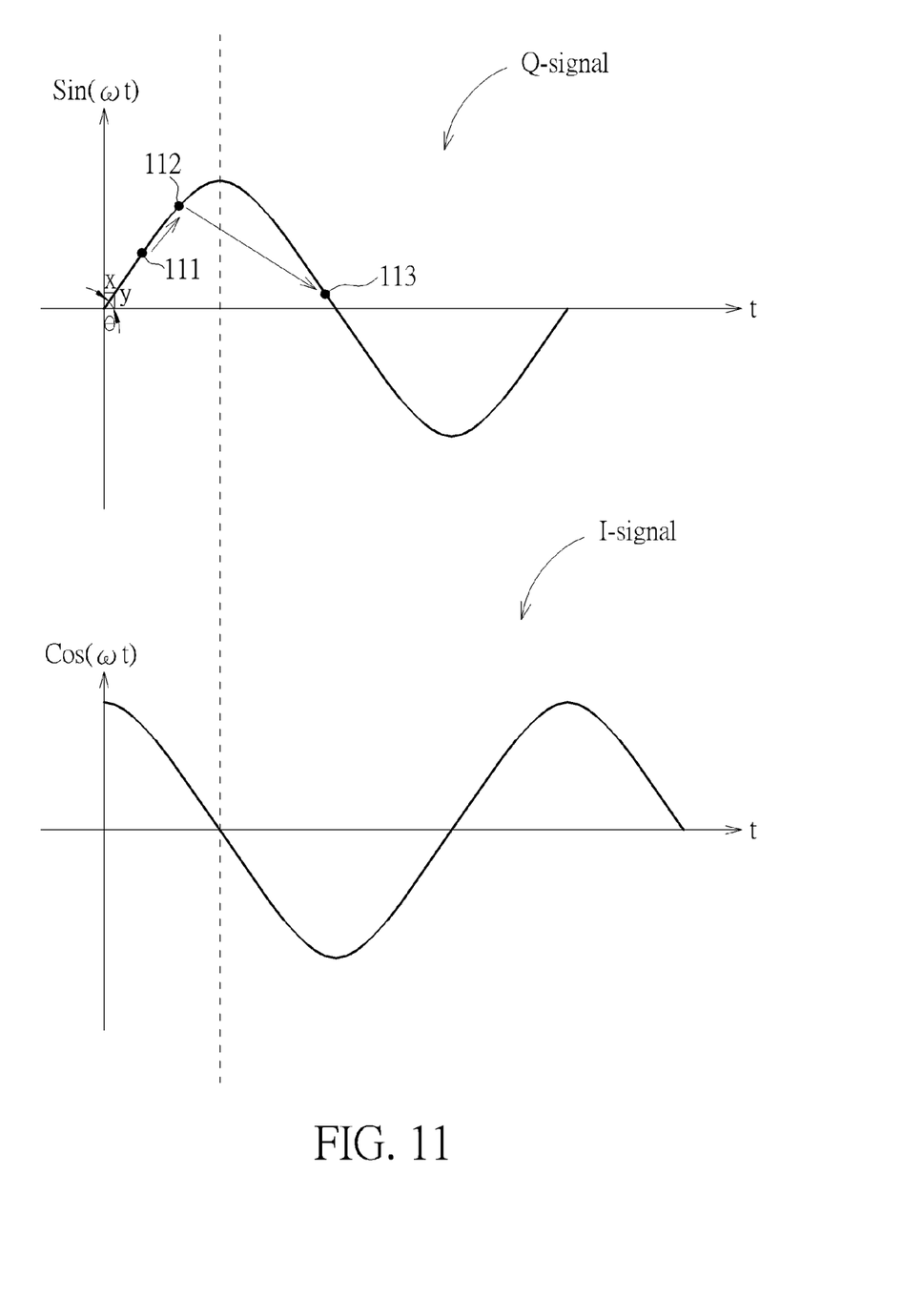
FIG. 11 illustrates a waveform diagram corresponding to the input signal of dual-modulation according to an embodiment of the present invention.

FIG. 11 illustrates a waveform diagram corresponding to the input signal Si of dual-modulation according to an embodiment of the present invention. The aforementioned input signal Si may be (but not limited to) a complex signal. For example, the input signal Si may be a dual-valued signal including an I-signal and a Q-signal. The I-signal may correspond to a cosine wave expressed as a waveform of cos(ωt), and the Q-signal may correspond to a sine wave expressed as a waveform of sin (wt). The I-signal comprises an I-phase and the Q-signal comprises a Q-phase.

The phase capturer 110 compares the I-phase with the Q-phase, and samples at least one of the I-phase and the Q-phase to obtain the first phase value P1. In one embodiment, the aforementioned first phase value P1 may be calculated by using the following equation (δ).

$$\tan(ωt)=\sin(ωt)/\cos(ωt)=Q/I;$$
$$P1=ωt=\arctan(Q/I) \qquad (δ).$$

The variable ω in the equation (δ) is angular frequency. The first phase value P1 may be obtained in this way, and this is the basic principle of coordinate rotation digital computing (cordic) algorithm. The first phase value P1 may be obtained by using another algorithm according to another embodiment of the present invention. According to the waveform diagram of the I-signal and the Q-signal shown in FIG. 11, when the Q-signal changes corresponding to a track going from a position 111 to a position 112, it may be known that the track is on a rising edge by referring to the waveform of the Q-signal. However, when the Q-signal changes corresponding to a track going from the position 112 to a position 113, it is difficult to know that the phase position has been moved along a rising edge and then a falling edge by merely referring to the waveform of the Q-signal. Hence, the waveform of the I-signal (having a different phase from the phase of the Q-signal) may be also referred to for better accuracy of distinguishing the phase of the input signal Si. However, when a sample rate is high enough, the phase of the input signal Si may be detected clearly by being sampled frequently. Furthermore, when a variation of phase is quite small, for example, when the angle θ is so small to make (sin θ) approximate zero, a signal phase may be obtained by using approximation such as obtaining a value y by using a value x shown in FIG. 11.

Figure 12:
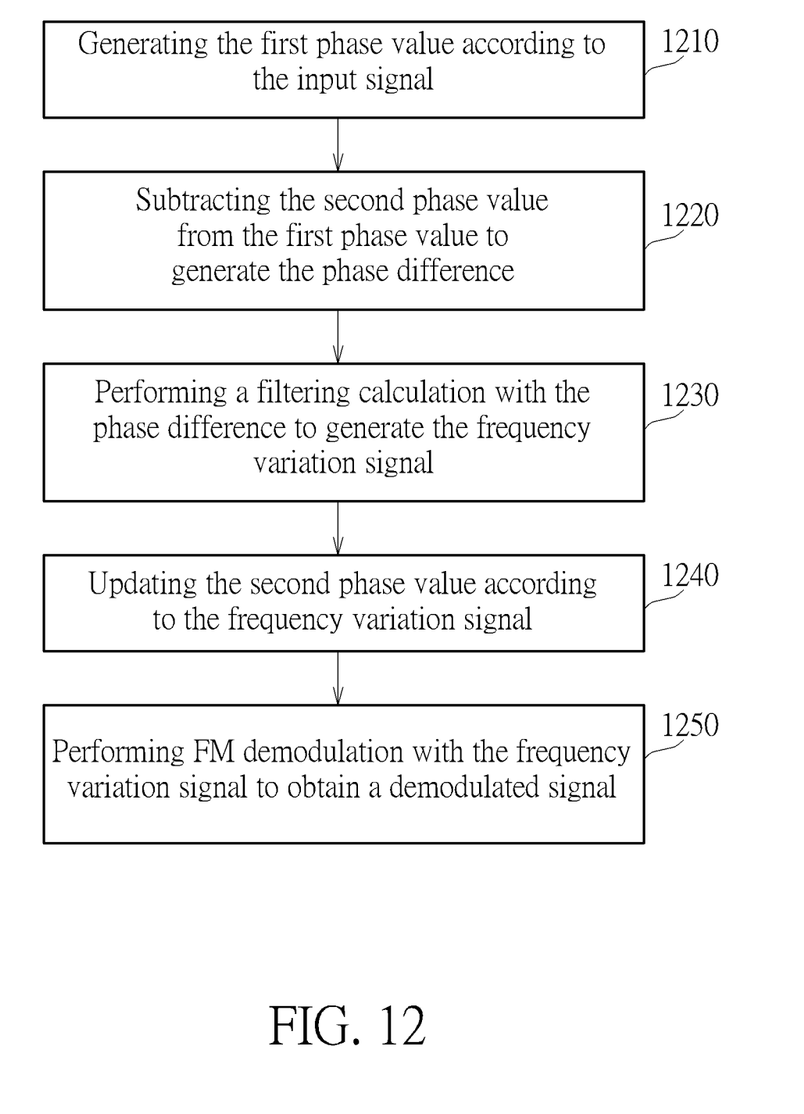
FIG. 12 illustrates a demodulation method used by a digital FM receiver according to an embodiment of the present invention.

FIG. 12 illustrates a flow chart of a demodulation method 1200 used by the digital FM receiver 100 according to an embodiment of the present invention. The demodulation method 1200 includes:

step 1210: generating the first phase value P1 according to the input signal Si;

step 1220: subtracting the second phase value P2 from the first phase value P1 to generate the phase difference Pd;

step 1230: performing a filtering calculation with the phase difference Pd to generate the frequency variation signal Sf;

step 1240: updating the second phase value P2 according to the frequency variation signal Sf; and step 1250: performing FM demodulation with the frequency variation signal Sf to obtain a demodulated signal.

Since the digital FM receiver disclosed by the embodiment of the present invention may be a feedback system as mentioned above, when the received input signal Si keeps changing, the phase difference Pd may be calculated continuously, the second phase value P2 may be updated continuously, and the changing of the input signal Si may be traced constantly to obtain the frequency variation used for FM demodulation. The demodulated signal mentioned in step 1250 may be, for example, voice of a radio program.

Figure 13:
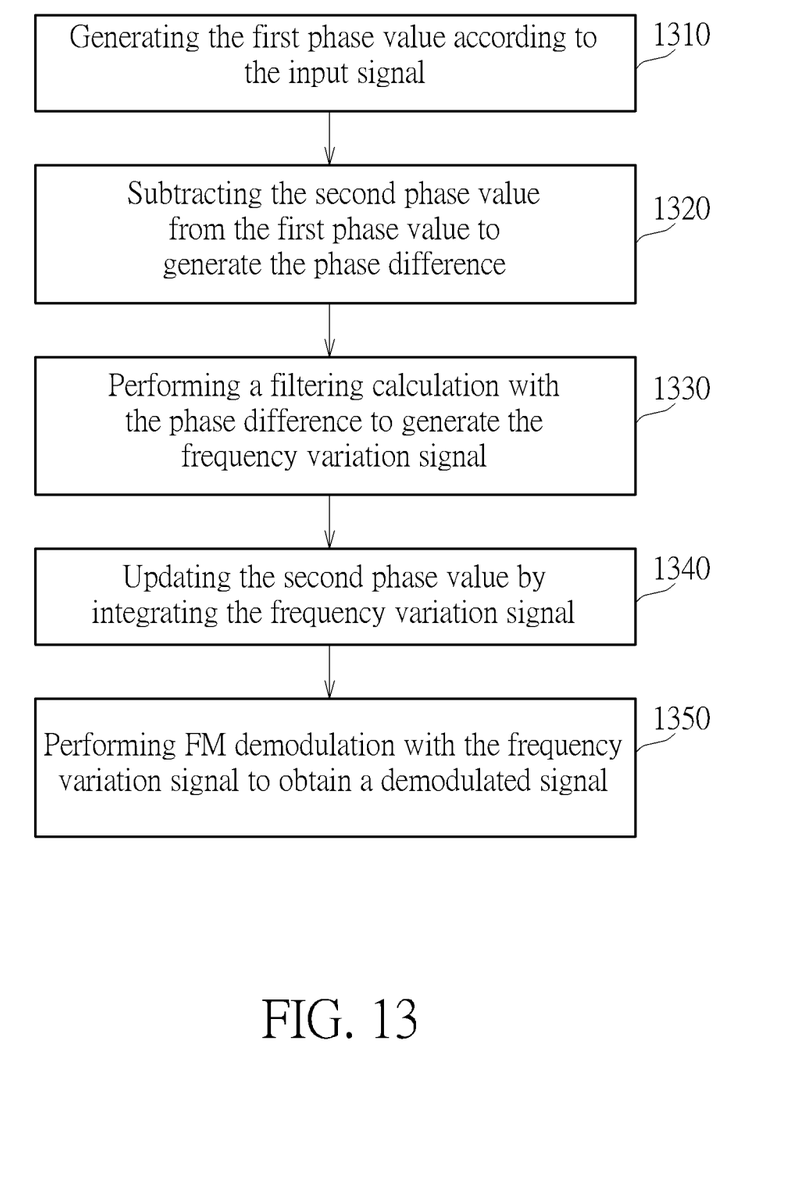
FIG. 13 illustrates a demodulation method used by a digital FM receiver according to another embodiment of the present invention.

FIG. 13 illustrates a flow chart of a demodulation method 1300 used by the digital FM receiver 300 according to another embodiment of the present invention. The demodulation method 1300 includes:

step 1310: generating the first phase value P1 according to the input signal Si;

step 1320: subtracting the second phase value P2 from the first phase value P1 to generate the phase difference Pd;

step 1330: performing a filtering calculation with the phase difference Pd to generate the frequency variation signal Sf;

step 1340: updating the second phase value P2 by integrating the frequency variation signal Sf; and step 1350: performing FM demodulation with the frequency variation signal Sf to obtain a demodulated signal.

The demodulation method 1300 may be performed by using the digital FM receiver 300 illustrated in FIG. 3. The operation principle is similar to description above, so it is not repeatedly described again.

Figure 14:
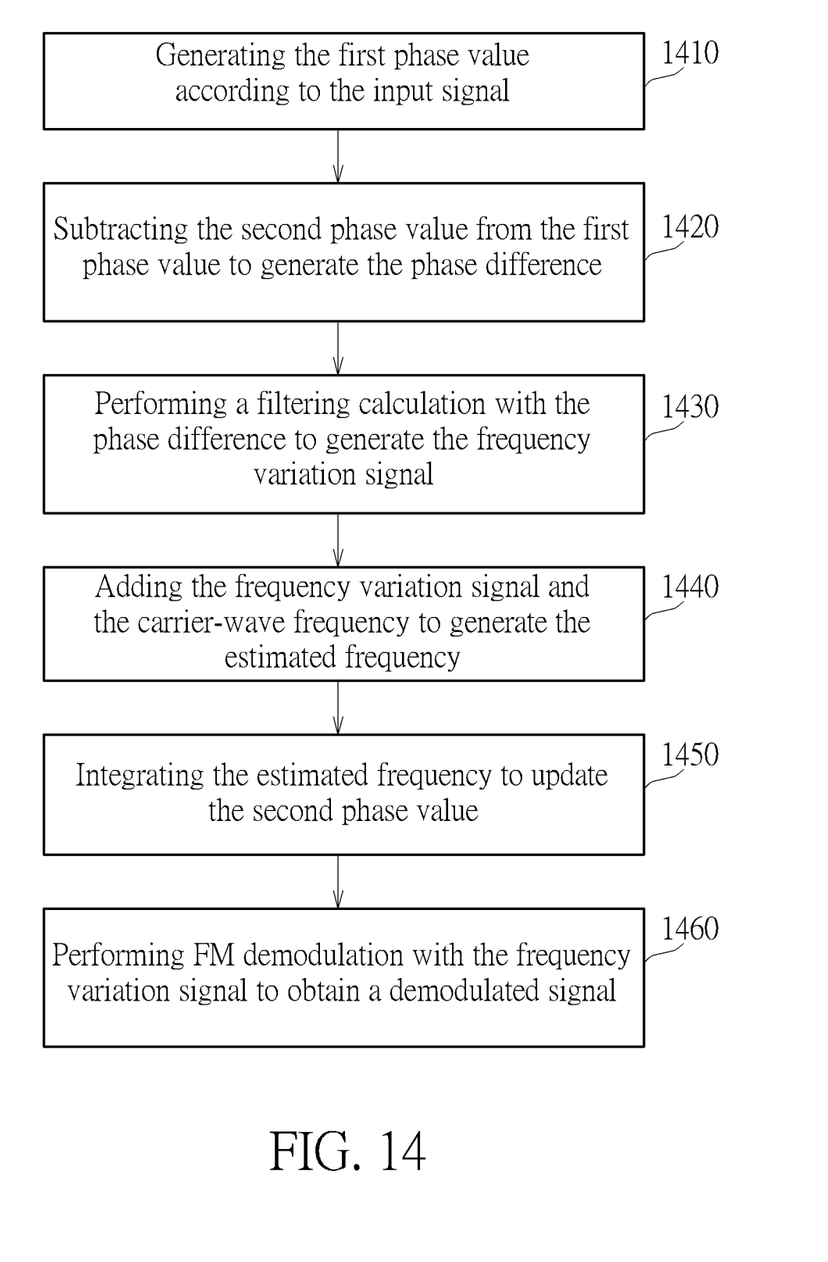
FIG. 14 illustrates a demodulation method used by a digital FM receiver according to another embodiment of the present invention.

FIG. 14 illustrates a flow chart of a demodulation method 1400 used by the digital FM receiver 500 according to another embodiment of the present invention. The demodulation method 1400 includes:

step 1410: generating the first phase value P1 according to the input signal Si;

step 1420: subtracting the second phase value P2 from the first phase value P1 to generate the phase difference Pd;

step 1430: performing a filtering calculation with the phase difference Pd to generate the frequency variation signal Sf;

step 1440: adding the frequency variation signal Sf and the carrier-wave frequency fc to generate the estimated frequency fe;

step 1450: integrating the estimated frequency fe to update the second phase value P2; and step 1460: performing FM demodulation with the frequency variation signal Sf to obtain a demodulated signal.

The demodulation method 1400 may be performed by using the digital FM receiver 500 illustrated in FIG. 5. The operation principle is similar to description above, so it is not repeatedly described here. In steps 1230, 1330 and 1430, the phase difference Pd may be used for performing a lowpass filtering calculation in serial to generate the frequency variation signal Sf. In the demodulation method 1400, since the estimated frequency fe may also carry information of the frequency variation of the input signal Si, the estimated frequency fe may be used when performing FM demodulation to obtain the demodulated signal.

In the demodulation methods 1300, 1400 and 1500, since the second phase value P2 also may also carry information of the frequency variation of the input signal Si, it may be allowed to differentiate the second phase value P2 to generate the frequency modulation signal Sm and perform FM demodulation with the frequency modulation signal Sm to generate a demodulated signal. This may correspond to the digital FM receivers 200, 400 and 600 illustrated in FIGS. 2, 4 and 6. In the digital FM receivers 200, 400 and 600 illustrated in FIGS. 2, 4 and 6, the second phase value P2 may be differentiated to generate the frequency modulation signal Sm by using the differentiator 250, 450 and 650.

In summary, a digital FM receiver disclosed according to an embodiment of the present invention may be a feedback system. By performing a series of phase calculation and tracking the changing of phase as described above, the function of phase lock loop can be achieved so that physical phase lock loop and physical voltage controller oscillator could be omitted, and the hardware cost and the power consumption may be hence reduced greatly. A digital FM receiver disclosed according to an embodiment of the present invention may also be implemented by digital circuitry easily. Therefore, a digital FM receiver disclosed according to an embodiment of the present invention makes good contribution to the related field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital frequency modulation receiver comprising:
   a phase capturer configured to generate a first phase value according to an input signal;
   a first adder coupled to the phase capturer and configured to subtract a second phase value from the first phase value to generate a phase difference;
   a digital filter coupled to the first adder and configured to perform a filtering calculation with the phase difference to generate a frequency variation signal; and
   a phase estimator coupled to the digital filter and the first adder and configured to update the second phase value according to the frequency variation signal, the phase estimator comprising:
      a second adder coupled to the digital filter and a carrier-wave source and configured to add the frequency variation signal and a carrier-wave frequency to generate an estimated frequency; and
      a first integrator coupled to the second adder and configured to integrate the estimated frequency to update the second phase value.

2. The digital frequency modulation receiver of claim 1, wherein the input signal is a frequency selection signal generated corresponding to channel selection.

3. The digital frequency modulation receiver of claim 1, further configured to output the frequency variation signal for performing frequency modulation demodulation to generate a demodulated signal.

4. The digital frequency modulation receiver of claim 1, wherein the phase capturer is a coordinate rotation digital computing converter.

5. The digital frequency modulation receiver of claim 1 further comprising:
   a differentiator coupled to the phase estimator and configured to differentiate the second phase value to generate a frequency modulation signal used for performing frequency modulation demodulation to generate a demodulated signal.

6. The digital frequency modulation receiver of claim 1, further configured to output the estimated frequency for performing frequency modulation demodulation to generate a demodulated signal.

7. The digital frequency modulation receiver of claim 1, wherein the digital filter is a second order filter comprising:
   a first multiplier coupled to the first adder and configured to multiply the phase difference by a first parameter to generate a first reference value;

a second multiplier coupled to the first adder and configured to multiply the phase difference by a second parameter to generate a second reference value;
a second integrator coupled to the first multiplier and configured to integrate the first reference value to generate a third reference value; and
a third adder coupled to the second integrator and the second multiplier and configured to add the third reference value and the second reference value to generate the frequency variation signal.

8. The digital frequency modulation receiver of claim 1, wherein the digital filter is a third order lowpass filter comprising:
a first multiplier coupled to the first adder and configured to multiply the phase difference by a first parameter to generate a first reference value;
a second multiplier coupled to the first adder and configured to multiply the phase difference by a second parameter to generate a second reference value;
a second integrator coupled to the first multiplier and configured to integrate the first reference value to generate a third reference value;
a one order lowpass filter coupled to the second multiplier and configured to perform lowpass filtering with the second reference value to generate a fourth reference value; and
a third adder coupled to the second integrator and the one order lowpass filter and configured to add the third reference value and the fourth reference value to generate the frequency variation signal.

9. The digital frequency modulation receiver of claim 1, wherein the input signal comprises:
an I-signal comprising an I-phase; and
a Q-signal comprising a Q-phase;
wherein the phase capturer compares the I-phase with the Q-phase, and samples at least one of the I-phase and the Q-phase to obtain the first phase value.

10. A demodulation method used by a digital frequency modulation receiver, comprising:
generating a first phase value according to an input signal;
subtracting a second phase value from the first phase value to generate a phase difference;
performing a filtering calculation to generate a frequency variation signal; and
updating the second phase value according to the frequency variation signal by adding the frequency variation signal and a carrier-wave frequency to generate an estimated frequency, and integrating the estimated frequency to update the second phase value.

11. The demodulation method of claim 10, further comprising:
performing frequency modulation demodulation with the frequency variation signal to generate a demodulated signal.

12. The demodulation method of claim 10, further comprising:
performing frequency modulation demodulation with the estimated frequency to generate a demodulated signal.

13. The demodulation method of claim 10, further comprising:
differentiating the second phase value to generate a frequency modulation signal; and
performing frequency modulation demodulation with the frequency modulation signal to generate a demodulated signal.

14. A digital frequency modulation receiver comprising:
a phase capturer configured to generate a first phase value according to an input signal;
a first adder coupled to the phase capturer and configured to subtract a second phase value from the first phase value to generate a phase difference;
a digital filter coupled to the first adder and configured to perform a filtering calculation with the phase difference to generate a frequency variation signal, the digital filter comprising:
a first multiplier coupled to the first adder and configured to multiply the phase difference by a first parameter to generate a first reference value;
a second multiplier coupled to the first adder and configured to multiply the phase difference by a second parameter to generate a second reference value;
a second integrator coupled to the first multiplier and configured to integrate the first reference value to generate a third reference value; and
a third adder coupled to the second integrator and the second multiplier and configured to add the third reference value and the second reference value to generate the frequency variation signal; and
a phase estimator coupled to the digital filter and the first adder and configured to update the second phase value according to the frequency variation signal.

15. The digital frequency modulation receiver of claim 14, wherein the digital filter further comprises:
a one order lowpass filter coupled to the second multiplier and configured to perform lowpass filtering for updating the second reference value;
wherein the third adder is coupled to the second integrator and the one order lowpass filter, and is configured to add the third reference value and the updated second reference value to generate the frequency variation signal.

* * * * *